US012758370B2

(12) United States Patent
Teichert Filho

(10) Patent No.: US 12,758,370 B2
(45) Date of Patent: Oct. 13, 2026

(54) DENTAL MORPHOLOGY SELECTION SYSTEM AND METHOD

(71) Applicant: Ruy Teichert Filho, Porto Alegre (BR)

(72) Inventor: Ruy Teichert Filho, Porto Alegre (BR)

( * ) Notice: Subject to any disclaimer, the term of this patent is extended or adjusted under 35 U.S.C. 154(b) by 56 days.

(21) Appl. No.: 18/836,781

(22) PCT Filed: Dec. 7, 2022

(86) PCT No.: PCT/BR2022/050484
§ 371 (c)(1),
(2) Date: Aug. 8, 2024

(87) PCT Pub. No.: WO2023/193073
PCT Pub. Date: Oct. 12, 2023

(65) Prior Publication Data

US 2025/0134624 A1 May 1, 2025

(30) Foreign Application Priority Data

Apr. 4, 2022 (BR) ......................... 102022006437-7

(51) Int. Cl.
*A61C 7/00* (2006.01)
*A61C 9/00* (2006.01)
*G06T 11/20* (2026.01)
*G06T 11/23* (2026.01)
*G06T 11/60* (2026.01)

(52) U.S. Cl.
CPC ............ *A61C 9/0053* (2013.01); *A61C 7/002* (2013.01); *G06T 11/23* (2026.01); *G06T 11/60* (2013.01); *G06T 2210/41* (2013.01)

(58) Field of Classification Search
CPC ... A61C 7/002; A61C 9/0053; A61C 13/0004; A61C 5/77; A61C 13/00; G06T 11/23; G06T 11/60; G06T 2210/41
See application file for complete search history.

(56) References Cited

U.S. PATENT DOCUMENTS

| | | | | |
|---|---|---|---|---|
| 8,092,215 | B2 | 1/2012 | Stone-Collonge et al. | |
| 8,352,060 | B2 | 1/2013 | Chun et al. | |
| 8,594,820 | B2 | 11/2013 | Manai et al. | |
| 9,566,132 | B2 | 2/2017 | Stone-Collonge et al. | |
| 10,192,320 | B2 | 1/2019 | Meletiou et al. | |
| 2023/0048898 | A1 * | 2/2023 | Cofar | G16H 30/20 |
| 2023/0051506 | A1 * | 2/2023 | Cofar | A61C 7/002 |
| 2024/0382288 | A1 * | 11/2024 | Jaisson | G16H 20/40 |

(Continued)

FOREIGN PATENT DOCUMENTS

| | | | |
|---|---|---|---|
| BR | PI0500830 | A | 11/2006 |
| BR | 102017022822 | A2 | 5/2019 |

(Continued)

*Primary Examiner* — Vijay Shankar
(74) *Attorney, Agent, or Firm* — Jose Cherson Weissbrot

(57) ABSTRACT

The present invention consists of a system with a method for dental selection that allows the layman (or dental professional) to perform the dental selection process autonomously, enabling him to demonstrate to the dental surgeon his expectations and aspirations regarding the dental morphology to be used in his rehabilitation. In addition, the solution in question makes use of an initial image, diagnosing each tooth of the smile and providing images at each stage so that the patient can choose the parameters and achieve the desired smile.

8 Claims, 9 Drawing Sheets

(56) References Cited

U.S. PATENT DOCUMENTS

Figure 1:
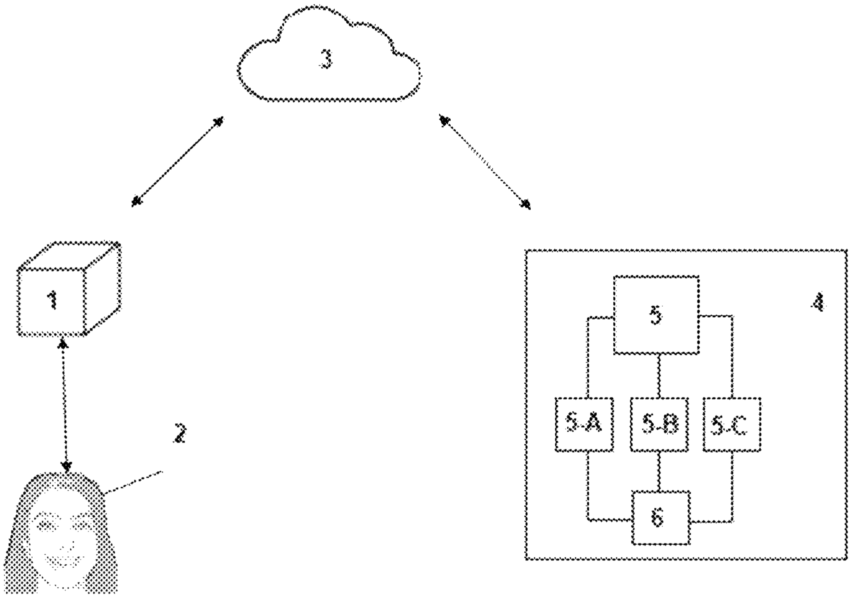

| | | | | |
|---|---|---|---|---|
| 2025/0005831 | A1* | 1/2025 | Prisby | G06T 11/60 |
| 2025/0186169 | A1* | 6/2025 | Cramer | G16H 20/30 |
| 2025/0200894 | A1* | 6/2025 | Peter | G06T 13/40 |

FOREIGN PATENT DOCUMENTS

| | | | |
|---|---|---|---|
| BR | PI1009891 | A2 | 3/2026 |
| WO | 2012035444 | A2 | 3/2012 |
| WO | 2015079086 | A1 | 6/2015 |

* cited by examiner

DENTAL MORPHOLOGY SELECTION SYSTEM AND METHOD

TECHNOLOGICAL FIELD OF THE INVENTION

The present patent of invention belongs to the technological field of dentistry, and refers, more specifically, to the development of a system with a method of dental selection for patients and dental professionals, allowing the layman to perform the dental selection process autonomously, enabling him to demonstrate to the dental surgeon, before or in parallel with the design of his smile, expectations and aspirations regarding the dental morphology to be used in their rehabilitation.

STATE OF THE ART

One of the main objectives of dental treatment is to provide smiles in a natural and aesthetic way, taking into account the individual and specific needs of each patient. The combination of dental prosthesis techniques associated with adhesive dentistry and smile design seeks to unite scientific and artistic principles in an attempt to obtain the most harmonious relationship between dental composition and dentofacial composition.

Symmetrical, aligned and luminous smiles can be perceived as "aesthetically beautiful". However, this perception does not depend entirely on standardized rules. The perception of beautiful smiles can be influenced by personal and cultural traits, which vary greatly between dental professionals and patients, since the terms "aesthetic" and "unaesthetic" are related not only to the capture of images, but also to the interpretation thereof. Standardizing the "ideal smile" and applying it to all patients can bring back the appearance that characterized the uniform smiles of full denture users in the 1960s, which ended up being characterized by the term "denture look".

Patient-centered care is a concept that has been addressed with varying degrees of success for quite some time in numerous healthcare settings, yet relatively little studied and applied in dentistry. This concept proposes to evaluate the patient beyond their biological needs, also taking into account their psychological needs through a view of them as a unique human being and their experience in relation to their disease, within their social environment as well as the circumstances that affect them and how they see their disease. It differs from the doctor-centered model of care, in which he dominates the consultation and the patient's main function is to respond to his questions and treatment proposals. The establishment of a professional/patient relationship developed from a therapeutic alliance built on trust and shared responsibility can bring benefits to treatments and results.

The Applicant of this patent application is the holder of patent of invention entitled "Scale for Choosing Teeth", PI No. 0500830. The invention was developed in 2005 for selecting teeth to be used in complete dentures. The scale was established as an important tool used by dentists and dental technicians in the complex process of determining which set of teeth has the best morphology for each patient in the manufacture of dentures and protocol-type prostheses.

The Applicant of the present patent application is also the holder of patent of invention "Method of dental selection and determination of the smile based on size, shape, alignment and arrangement of teeth" PI 10 2017 022822 3 A2 established as an important planning tool for aesthetic and functional rehabilitations and definition of treatment plan.

The patents mentioned above were successful in their development and brought improvement to dental professionals, but these methods require specific in-depth knowledge in dentistry, and are not recommended for use by laypeople due to the various techniques that are implemented. Additionally, they are more time-consuming and not very intuitive processes.

The current state of the art demonstrates strong evidence of the lack of definition of the characteristics that make a smile aesthetically acceptable to the eyes of laymen. Despite the great advances that allow smile design, virtual planning, and smile simulation techniques, it becomes evident that the most interested party, the patient, remains unable to actively participate in choosing their teeth. This important step is left to the dental prosthesis professional or technician and depends solely on their personal, technical, artistic, or even intuitive ability to capture the personality and desires of the patients, translating this into the final expected result for the patient, who only has the role of approving or disagreeing with the proposed dental morphology for their rehabilitation.

In this context, one of the problems associated with the current state of the art is the lack of a methodology capable of providing autonomy to the patient to perform the dental selection process by themselves, regardless of cultural differences and expectations between them and the professional who will perform their treatment. Enabling him to clearly express what are the expectations in relation to the size and shape of the teeth and the way they relate to each other and to the patient's face in the formation of a harmonious dentofacial composition that is pleasing to the patient's own eyes.

The clinical practice of "Scale for Choosing Teeth", No. PI 0500830 and the "Method of dental selection and determination of the smile based on size, shape, alignment and arrangement of teeth", PI 10 2017 022822 3 A2 evidenced the need for a system and method capable of providing independence to the patient so that they could perform the dental selection process by themselves, facilitating communication between laypeople and dental professionals.

That said, it is noted that some patent documents exemplify the current state of the art. Patent of invention No. US20140342304, entitled "Dental Method of Smile Design", discloses a method for improving a patient's smile, comprising several steps, including the analysis of the old smile, creation of a new smile based on old data, making adjustments to the images, producing a temporary prosthesis, applying the temporary prosthesis until the permanent prosthesis is produced and applied. This method has the limitation of requiring a database of smiles and needing previous technical knowledge, not being intuitive, as it performs the elaboration of the prosthesis.

Patent of invention No. US20090291408, entitled "Smile designer", discloses a method implemented in a computing device for the design of a restored smile, the method comprises the steps of scanning the teeth and smile, mapping reference points in the image data of a smile, creating a line that intersects the reference points and defines a line from the inner edge of the smile, creating a dental treatment plan for the digital model of teeth, combining the patient's digital model of teeth with the data of the smile image and showing the smile as it would appear in the final condition according to the inner lip line and digital model in the final condition. This method presents the limitation of the need for a person skilled in the art, for the elaboration of the patient's smile, it does not present in an intuitive way how the smile should be shaped, but rather requires the user to make the changes, this being possible only by a professional, as a layman could make mistakes compromising the final result.

Invention patent No. US20070141536, entitled "Method and Apparatus for Designing a Three-Dimensional Model of a Dental Prosthesis", discloses a method and system for designing a three-dimensional model of a dental prosthesis. Separate components that have different functions are identified in the prosthesis and designed separately. The components are then spatially juxtaposed to form the dental prosthesis model. Different design tools are used to design each component separately in such a way that each shape is combined with an editing and design tool that best suits its particularities. This method has the limitation of working with separate components and in the end generating a result, requiring technical knowledge for its elaboration Patent of invention No. US20120070803, entitled "Prosthesis Manipulation in Dental Prosthesis Design", discloses systems of methods, means of computer reading, techniques, and processes for the crown or manipulation of the prosthesis in the design of the dental prosthesis, including the presentation of a 3D model of a multi-tooth prosthesis in relation to an area to be reconstructed. An operator can manipulate one or more denture teeth in which the 3D model, in order to change the overall shape of the denture. The techniques may also include determining occlusion with respect to the antagonist teeth of the entire 3D prosthesis model and/or individual 3D models of the prosthesis teeth to the model. The position or shape of the 3D model of the prosthesis can be modified based on occlusion.

Invention patent No. PI 1009891-7, entitled "System and Method for Planning, Visualization, and Optimization of Dental Restorations," describes a method for planning, visualizing, and/or optimizing a dental restoration on at least one portion of a patient's pre-prepared teeth. The method comprises stages of elaboration of a 3D digital model, design of a restoration model, realization of a 3D digital model of at least a part of the prepared teeth and alignment of the 3D models of the pre-prepared teeth and the prepared teeth.

Observing the methods described in the state of the art, there is an evident need for at least one person skilled in the art to draw up a design for the patient's teeth or smile. In this way, even though numerous techniques of "Smile Design" are known, there is a lack of a systematic and communication process capable of providing autonomy to the patient so that he can perform the dental selection autonomously and independently, prior to the design of his future smile, expressing to the dental surgeon his expectations and choice of "his teeth" that will be used in his rehabilitation.

Currently, there is no known method and system on the market capable of simplifying the dental selection process to the point that the patient himself chooses the morphology and arrangement of the teeth that will be used in his oral rehabilitation, which has the following characteristics:

- Enable the patient to diagnose their oral condition, their smile and their relationship with their face to obtain a harmonious dentofacial composition;
- Enable the patient to understand the tooth as a primordial unit and their relationship with their neighbors in the formation of the smile composition and how this smile will relate to the face in the formation of the dentofacial composition and its relationship with the formation of a new unit;
- Enable the patient to assemble the teeth on a photograph and understand the relationship of each dental element in the diagnosis of their oral condition, their smile, and their relationship with their face to achieve a harmonious dentofacial composition;
- Enable the patient to take an appropriate photograph to carry out the dental selection process;
- Enable the patient to diagnose their oral and smile condition for planning and determining the size of teeth to be used in their oral rehabilitation;
- Enable the patient to use the fundamental forms currently used in dentistry and understand their relationship with their face in the pursuit of the best dentofacial composition;
- Enable the patient to diagnose and plan the use of mixed forms using the size previously chosen in the diagnosis for a more harmonious dentofacial composition;
- Enable the patient to diagnose, evaluate and plan tooth alignment and its relationships with horizontal facial lines to determine the amount of dental exposure during the smile or during the lip resting position;
- Enable the patient to diagnose, evaluate and apply the individual variations in the long axis of the teeth and their relationship with the concept of dental arrangement to obtain a smile with a natural, non-artificial appearance.

Novelties and Objectives of the Invention

The objective of the present invention is a system with a patient-centered method of dental selection, capable of providing autonomy and freedom, enabling him to carry out the process of dental selection to determine the morphology of the teeth to be used in his rehabilitation, which effectively solves the limitations of the state of the art mentioned above.

The patient-centered dental selection method comprises four main steps for the elaboration, starting with the digitization of the patient's facial photograph, diagnosis of the initial smile condition, from the diagnosis the desired tooth size is selected, images with different sizes are provided for the patient to select the desired one, after choosing, images are available to choose the shape of the tooth and then it is possible to choose, also from images, the arrangement of the teeth, resulting in a final smile that also allows the patient to act individually on each tooth element.

Advantages and Technical Effects of the Invention

The system and method of dental selection, object of this invention, results in the following advantages and achieves the following technical effects on the systems and methods of dental selection of the state of the art:

- Enables direct communication between the patient and the professional according to their expectations and cultural concepts of aesthetics in order to serve as support for dental selection prior to the design of the smile and future establishment of the treatment plan by the professional together with the patient;
- The proposed planning system and tool enables and optimizes the performance of professional consultations online, making it possible for the patient to identify their needs and what bothers them, empowering laypeople to communicate effectively with the Dental Surgeon.
- Tooth selection can occur before the smile design, which is smile planning.
- The Dental Surgeon can plan and define a treatment plan without the patient being present before the in-person consultation.

- The dental professional can prepare the simulation consultation of the final results for restoration tests, considerably reducing the number of appointments;
- Enables the clinical applicability of the most modern patient-centered treatment concepts through the direct participation of the patient in the choice of teeth that will be used in their oral rehabilitation and in their final appearance;
- Enables optimization of the dentofacial composition by evaluating the impact that each set of teeth with its specific dimensions, variations in shape, variations in the amount of dental exposure and variations in dental arrangement will exert on the patient's face and which will provide the most aesthetic and harmonic results in constructing a smile with beauty, naturalness, personality and individuality.
- Following the request and performance of complementary exams by the patient prior to the face-to-face consultation with the Dental Surgeon, the professional can make the diagnosis and define the treatment plan based on the patient's expectations and aspirations as a guide for determining dental morphology in the concept of patient-centered treatment; and
- The solution developed differs substantially from that known in the state of the art by presenting step by step to the layman a way capable of guiding him through a sequential and logical flow, enabling him to determine the dental morphology to be applied in his aesthetic and/or functional rehabilitation, autonomously and independently.

DESCRIPTION OF THE ACCOMPANYING DRAWINGS

Figure 2:
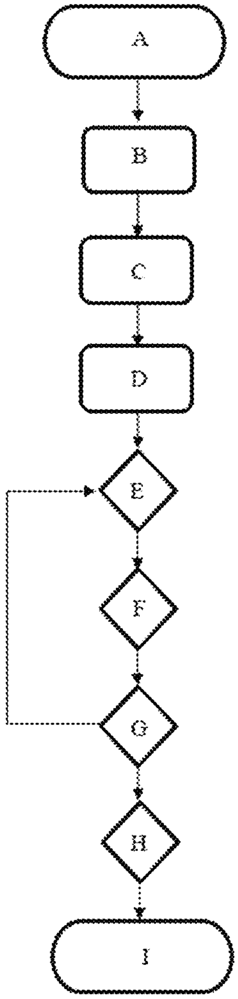
Figure 3:
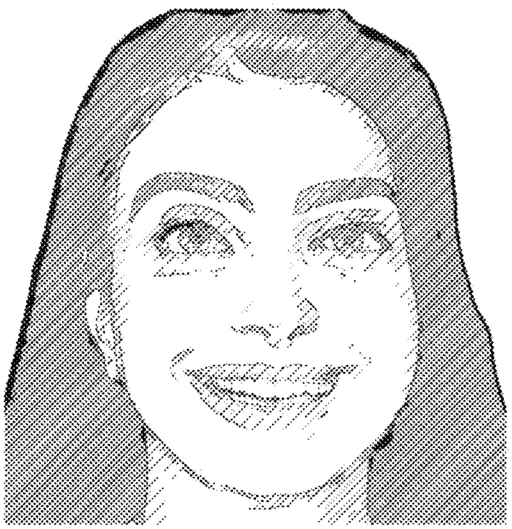
Figure 4:
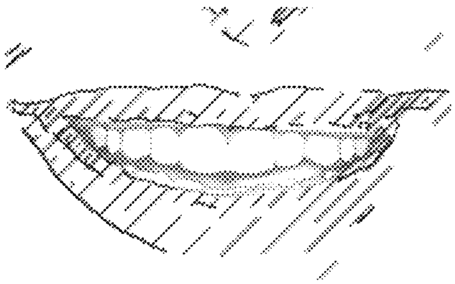
Figure 5:
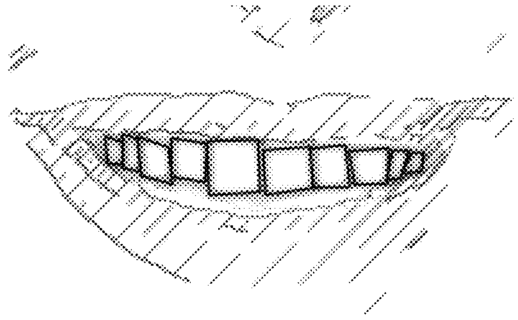
Figure 6:
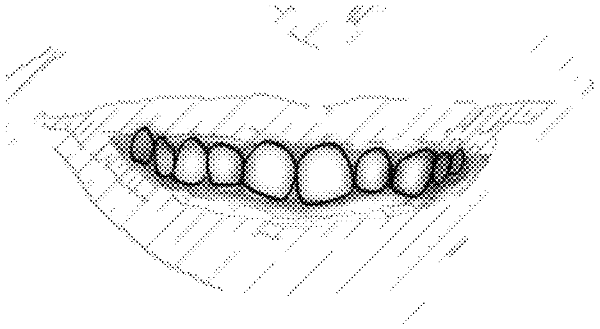
Figure 7:
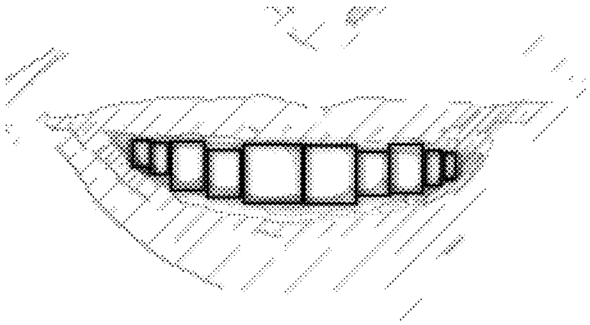
Figure 8:
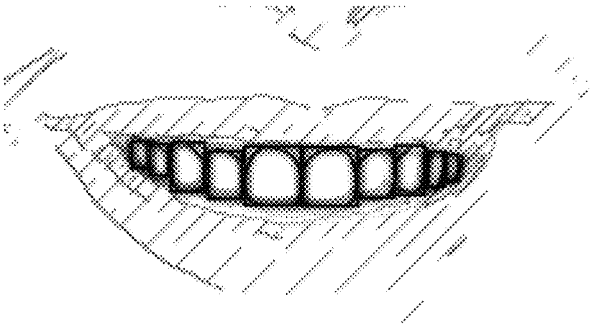
Figure 9:
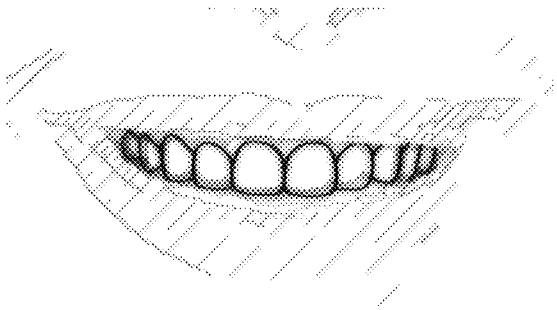
Figure 10:
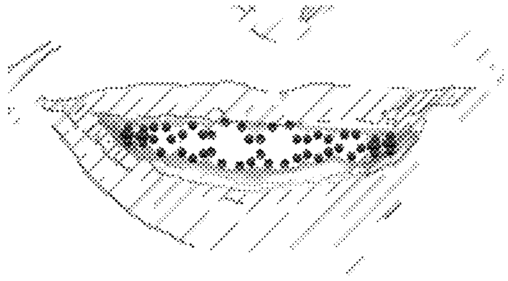
Figure 11:
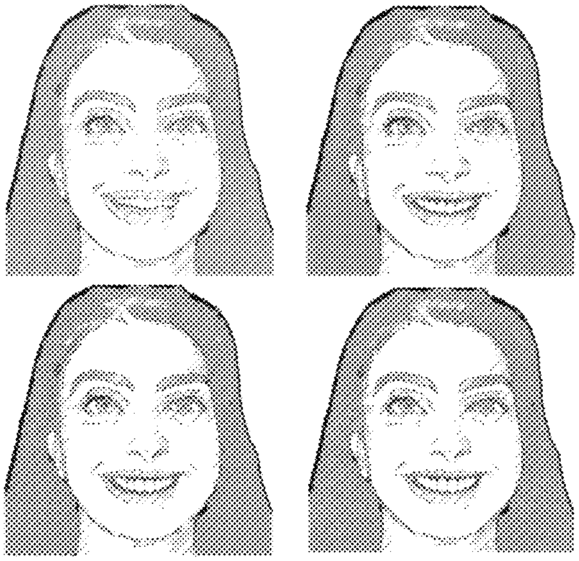
Figure 12:
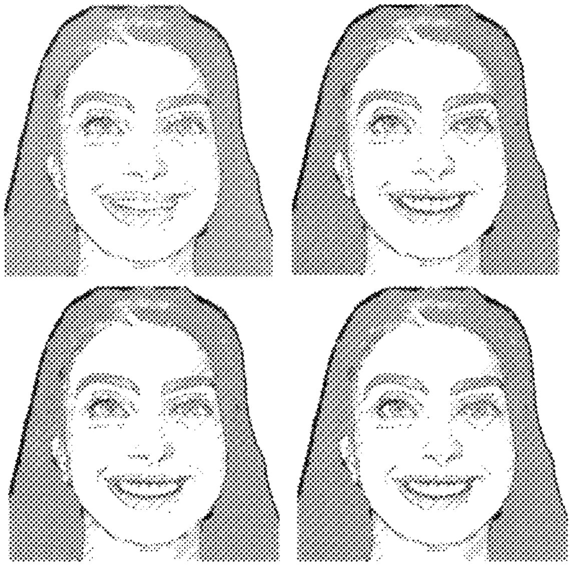
Figure 13:
Figure 14:
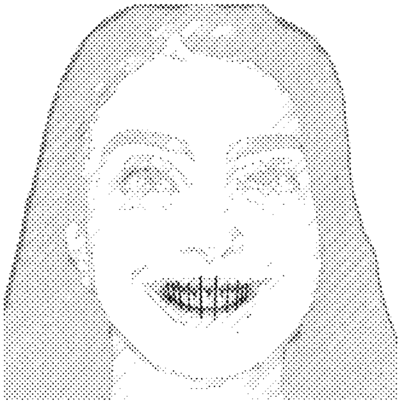

In order for this invention to be fully understood and put into practice by any person skilled in this technological field, it is now described in a clear, precise and sufficient manner, based on the accompanying drawings, listed below, which illustrate the preferred ways of carrying out the system and the method:

FIG. 1—represents the diagram of the system proposed in the present invention;

FIG. 2—represents the flowchart with the steps of the method proposed in the present invention;

FIG. 3—represents the initial photo of the smile taken by the very patient or dental professional;

FIG. 4—represents the enlarged photo of the smile taken by the patient or dental professional;

FIG. 5—represents the process of quadrilateral formation that will allow the diagnosis of the original dental condition;

FIG. 6—represents the quadrilaterals following the tooth margins misaligned according to the original condition;

FIG. 7—represents the possibility that, alternatively, if the patient or professional feels more comfortable, they can diagnose the original condition using dental masks directly instead of quadrilaterals;

FIG. 8—represents the quadrilaterals positioned according to the aesthetic alignment proposed by the current state of the art;

FIG. 9—represents the insertion of dental masks in the quadrilaterals with the teeth in their respective positions: central incisor, lateral incisor, canine, 1st premolar, 2nd premolar, 1st molar, and 2nd molar, previously established according to a standard smile. These images can optionally be of the outline of a dental element, a solid representation of a tooth, or a representation with variable opacity to allow the visualization of the original condition on the image;

FIG. 10—represents the possibility of using the algorithm system used to identify lips and teeth, which allows the diagnosis of the original condition to occur automatically by calculating the positioning of the quadrilaterals, generating quadrilaterals (FIG. 5) or dental masks as per (FIG. 6);

FIG. 11—represents the process of determining the first parameter: size; from the positioning of the images side by side to evaluate the impact that each set of teeth with their specific dimensions will have on the patient's face in order to determine the first size parameter;

FIG. 12—represents the process of determining the second parameter: shape; from the positioning of the images side by side to evaluate which set of teeth with their variations in shape will provide the most harmonious result in the dentofacial composition;

FIG. 13—represents the process of determining the third parameter: amount of dental exposure; from the movement of the set of teeth up or down, harmonizing the smile with the other horizontal lines; and FIG. 14—represents the final smile and the process of determining the fourth parameter: Personalization and individualization of the smile through interventions in the long axis of the teeth.

DETAILED DESCRIPTION OF THE INVENTION

The present invention consists of a system with a method for dental selection that allows the layman (or dental professional) to perform the dental selection process autonomously, enabling him to demonstrate to the dental surgeon his expectations and aspirations regarding the dental morphology to be used in his rehabilitation. In addition, the solution in question makes use of an initial image, diagnosing each tooth of the smile and providing images at each stage so that the patient can choose the parameters and achieve the desired smile.

Thus, the technology described in the present patent application basically consists of: a method of dental selection and determination of the smile based on the size, shape, exposure of the teeth. This method can be dedicated to use in all branches of Dentistry, whether total dentures (dentures), protocol-type prostheses (dentures on implants), prostheses, veneers on teeth or any other condition that requires the determination of the teeth to be used in the reconstruction of the smile.

FIG. 1 details the system of the present invention, which consists of a cell phone (1) or camera that captures a photo of the patient's smile (2), and communicates through an internet network (3) with a computer (4) or similar equipment with a processor. The computer (4) is responsible for enabling the visualization of the photo (2) and executing the program with a dental selection method (5) that, through the photo (2) of the patient's smile, provides alternatives for modifications and generates a final smile (6). The dental selection method (5) uses the photo (2) as the initial smile and consists of changing three smile parameters, namely: size (5-A), shape (5-B), and exposure (5-C), modifying them according to the desired outcome, generating a final virtual smile image (6) that will be sent over the internet (3) to the cell phone (1), or similar equipment, of the dental professional who will perform the modifications in the patient's dental morphology so that it is as close as possible to the image of the final virtual smile (6).

The method (5) allows for dental selection and the creation of a smile by a layperson or professional in the field, through any equipment that contains a processor.

FIGS. 2 to 14 represent the method (5) of the present invention preferably comprises the following steps:

A) Acquisition of facial photograph, initial smile (2);

B) The initial condition of the smile is diagnosed by drawing a horizontal line on the cervical of each tooth, a horizontal line on the incisal of each tooth, a vertical line on the proximal side of each tooth, one on the 15th mesial surface and another on the distal face in order to obtain a quadrilateral in each tooth element;

C) From the initial diagnosis, the system will align these quadrilaterals or dental masks in a harmonious and aesthetic way, according to the state of the art recommended in aesthetic dentistry, in order to enable the selection of tooth parameters.

D) From the diagnosis (generation of irregular quadrilaterals) followed by the repositioning of the quadrilaterals in a harmonious way according to the aesthetic concepts of the current state of the art, the system will insert the dental masks in their respective positions: central incisor, lateral incisor, canine, 1st Premolar, 2nd Premolar, 1st Molar and 2nd Molar, previously established according to a standard smile. These images can optionally be of the outline of a dental element, a solid representation of a tooth, or a representation with variable opacity to allow the visualization of the original condition on the image;

E) You choose which of the three parameter options you would like to change, between size (5-A), shape (5-B) or exposure (5-C) of the teeth; they can be chosen randomly, however, preferably starting with the size, the patient chooses which size of teeth he prefers, evaluating the impact that the dimensions of each set will have on his face, followed by the way where, from the previously established dimensions, the system will suggest variations in tooth shapes so that the patient can choose the most harmonious shape to be used on his face; followed by the determination of the amount of dental exposure.

F) At least three images of the variations of the selected parameter are displayed, positioning them side by side and selecting the desired option by the user;

G) The desired option is saved and you are asked if you want to change another parameter, if so, the smile with the change from step F) returns to step E); if not, it goes to stage H);

H) After changing the desired parameters, you select whether you want to personalize the smile through individual action on each dental element; and I) With the changes in the selected parameters, the image of the final smile (6) is obtained according to the chosen parameters.

In the parameter selection for smile design, the user can choose to select one or more parameters to achieve the final smile. In this process, the option to change the size, shape and exposure of the teeth will be available.

The alternatives presented to the user are images of the facial photograph initially added, altered by artificial intelligence, so that the user can view and choose the one that best suits their taste.

For each parameter, at least four images will be provided for the user to choose the one that best suits their preference, including the original image and three other variations.

In the size parameter it will be possible to decide between small, medium or large teeth. For the format parameter, it will be possible to choose between rounded, square or triangular teeth. For the exposure parameter, the patient will move the previously established set up up or down, in order to harmonize the smile line with the lip and other horizontal lines.

Optionally, in step A), the acquisition of the photograph can be with the use of facial markers and/or dental markers;

Specific markers are specially developed to be used in maintaining proportionality between real and virtual findings, as well as in the overlay of images when necessary. When projecting teeth in a virtual environment, it is necessary to establish a proportion between real and virtual findings. This is necessary, especially when we will evaluate this final result in view of the impact that a certain set will have on the patient's face and on the final result. In this way, these markers, which consist of small geometric shapes, are positioned at strategic points in the mouth so that the software can calculate and adjust the virtual and real images in a simple and accurate way.

Also, when it is necessary to overlap images between different photographic shots or in varied virtual environments, for example, when after the preparation of the dental remnants there is a need to relate this arch to the previously planned one, simply use these markers for overlapping the images informing. These markers are small acrylic pieces or any other material that has sufficient rigidity and are easy to see and scan that will be "glued" to the tooth surfaces or even mucosa for this purpose.

Alternatively, in step B) the patient or professional can plan directly from the quadrilaterals, without the need to draw line by line. In this option, the system creates 2 to 8 quadrilaterals (depending on how many teeth you will work with) with various shapes that follow the dental dimensions. The patient can merely adjust the size of the quadrilateral as well as its slant in the original condition. Alternatively, this process of diagnosing the original condition can also occur automatically, where the system, from the pre-established logarithm, reads and interprets the position of the lip, central incisors, lateral incisors, canines, 1st and 2nd premolar, 1st molar and 2nd upper molar.

Optionally, in step D) instead of quadrilaterals, dental contours can appear directly so that the system or patient can diagnose the initial condition;

It should be noted that the drawings and description presented are not intended to limit the ways in which the inventive concept proposed here can be implemented, but to illustrate and make understandable the conceptual innovations revealed by the invention. Thus, the descriptions and images should be interpreted in an illustrative and not limiting way, and there may be other equivalent or analogous forms of implementation that should be considered within the scope of this invention.

This specification deals with a method of dental selection that results in a new technical effect in relation to the prior art, thus proving its novelty, inventive activity, descriptive sufficiency [full disclosure], and industrial application, meeting all the requirements for granting a patent of invention.

The invention claimed is:

1. A dental morphology selection system and method, characterized by consisting of a cell phone or camera that captures a photo of the patient's smile, and communicates with a computer over an internet network; the computer allows the visualization of the photo and executes the program with a dental selection method that, through the photo of the patient's smile, provides alternatives for modifications and generates a final smile; the dental morphology selection method uses the photo as the initial smile and consists of changing three smile parameters, namely: size, shape and exposure, modifying them as desired, generating a final virtual smile image that will be sent through an internet network to the cell phone or to the computer of the dental professional who will perform the modifications in the patient's dental morphology so that it is as close to the image of the final virtual smile.

2. The dental morphology selection method, implemented by the dental morphology selection system defined in claim 1, characterized by performing the steps automatically or manually by the user, comprising the following steps:

a) acquisition of facial photograph;

b) the initial condition of the smile is diagnosed by drawing a horizontal line on the cervical of each tooth, a horizontal line on the incisal of each tooth, a vertical line on the proximal side of each tooth, one on the mesial surface and another on the distal surface in order to obtain a quadrilateral in each tooth element;

c) from the initial diagnosis, these quadrilaterals are aligned in an aesthetically harmonic manner established by the patient or by the system (logarithm) in order to enable the selection of tooth parameters;

d) in these quadrilaterals, images of teeth in their respective positions are added: central incisor, lateral incisor, canine, 1st Premolar, 2nd Premolar, 1st Molar and 2nd Molar, previously established according to a standard smile;

e) it is chosen which of the three parameter options you would like to change, between size, shape or exposure of the teeth;

f) at least three images of the variations of the selected parameter are displayed on the initial photograph and the original teeth, positioning them side by side and selecting the desired option by the user;

g) the desired option is saved and you are asked if you want to change another parameter, if so, the smile with the change in step f) returns to step e); if not, it goes to stage h);

h) after the desired parameters have been changed, it is selected whether to customize the smile through individual action on each dental element; and i) with the changes in the selected parameters, the image of the final smile is obtained according to the chosen parameters.

3. The dental morphology selection method according to claim 2, characterized by being possible to use facial markers and/or dental markers to guide the positioning of each tooth and the amount of dental exposure.

4. The dental morphology selection method according to claim 2, characterized in that the user can select one, two or three parameters to obtain the final smile.

5. The dental morphology selection method according to claim 2, characterized in that the user preferably follows the following order of parameters for selecting dental morphology: it starts by selecting the size of the teeth, followed by the selection of the shape, and then determines the amount of dental exposure.

6. The dental morphology selection method according to claim 2, characterized in that in step B) the patient or professional directly plans the dental morphology from the quadrilaterals automatically created by the system, without the need to draw line by line.

7. The dental morphology selection method according to claim 2, characterized by the possibility of the tooth selection process occurring directly with the dental masks if the operator feels more able to manipulate the positioning of the teeth on the facial photo photograph instead of the quadrilaterals.

8. The dental morphology selection method according to claim 2, characterized by the possibility of the tooth selection process occurring before the smile design stage or parallel to the smile design stage.

* * * * *